US009897205B2

(12) United States Patent
Beaudoin et al.

(10) Patent No.: US 9,897,205 B2
(45) Date of Patent: Feb. 20, 2018

(54) ROLLER POSITION CONTROL IN A TORIC-DRIVE CVT

(71) Applicant: TRANSMISSION CVTCORP INC., Sainte-Julie (CA)

(72) Inventors: Samuel Beaudoin, Quebec (CA); Kenneth Huston, Montreal (CA)

(73) Assignee: TRANSMISSION CVTCORP INC., Quebec (CA)

( * ) Notice: Subject to any disclaimer, the term of this patent is extended or adjusted under 35 U.S.C. 154(b) by 666 days.

(21) Appl. No.: 14/395,460

(22) PCT Filed: Apr. 16, 2013

(86) PCT No.: PCT/CA2013/000366
§ 371 (c)(1),
(2) Date: Oct. 17, 2014

(87) PCT Pub. No.: WO2013/155602
PCT Pub. Date: Oct. 24, 2013

(65) Prior Publication Data
US 2015/0133262 A1 May 14, 2015

Related U.S. Application Data

(60) Provisional application No. 61/635,381, filed on Apr. 19, 2012.

(51) Int. Cl.
F16H 15/38 (2006.01)
F16H 63/30 (2006.01)
(Continued)

(52) U.S. Cl.
CPC ......... F16H 63/3013 (2013.01); F16H 15/38 (2013.01); F16H 61/664 (2013.01);
(Continued)

(58) Field of Classification Search
CPC ...... F16H 15/38; F16H 61/664; F16H 63/067; F16H 63/08; F16H 63/3013
(Continued)

(56) References Cited

U.S. PATENT DOCUMENTS 3,276,279 A 10/1966 Perry et al.
3,394,617 A 7/1968 Dickenbrock
(Continued)

FOREIGN PATENT DOCUMENTS

CN 102144112 A 8/2011
CN 102352920 A 2/2012
(Continued)

OTHER PUBLICATIONS

Chinese Office Action with Search Report dated Jun. 3, 2016, issued in corresponding Chinese Patent Application No. 201380027670.6. (English Translation).
(Continued)

Primary Examiner — William C Joyce
(74) Attorney, Agent, or Firm — Venable LLP; Keith G. Haddaway

(57) ABSTRACT

A roller position control mechanism including a steering element, positioned inside the bearing of each roller and provided with a skew shaft and a steering shaft defining an angle therebetween. A spider element fixes the steering element to a longitudinal shaft of the CVT and a control ring element interconnects the steering elements of the various rollers. Movement of the control ring element with respect to the spider element translates to a tilting movement of the rollers, thanks to the angle between the skew and steering shafts.

17 Claims, 5 Drawing Sheets

(51) Int. Cl.
*F16H 63/06* (2006.01)
*F16H 61/664* (2006.01)
*F16H 63/08* (2006.01)

(52) U.S. Cl.
CPC ........... *F16H 63/067* (2013.01); *F16H 63/08* (2013.01); *F16H 2015/386* (2013.01)

(58) Field of Classification Search
USPC .............................................. 476/40, 42, 46
See application file for complete search history.

(56) References Cited

U.S. PATENT DOCUMENTS

| | | | |
|---|---|---|---|
| 3,581,587 | A | 6/1971 | Dickenbrock |
| 2002/0026842 | A1 | 3/2002 | Tomidokoro |
| 2006/0247090 | A1* | 11/2006 | Nishii ..................... F16H 15/38 476/40 |

FOREIGN PATENT DOCUMENTS

| | | | |
|---|---|---|---|
| GB | 482493 | A | 3/1938 |
| GB | 665237 | * | 1/1952 |
| WO | WO-2006/034582 | A1 | 4/2006 |
| WO | WO-2010/070341 | A1 | 6/2010 |
| WO | WO-2011/129898 | A2 | 10/2011 |

OTHER PUBLICATIONS

International Search Report dated Jul. 30, 2013 in International Patent Application No. PCT/CA2013/000366.
Written Opinion dated Jul. 30, 2013 in International Patent Application No. PCT/CA2013/000366.
Extended European Search Report in European Patent Application No. EP 13777582.1, dated Aug. 12, 2016.

* cited by examiner

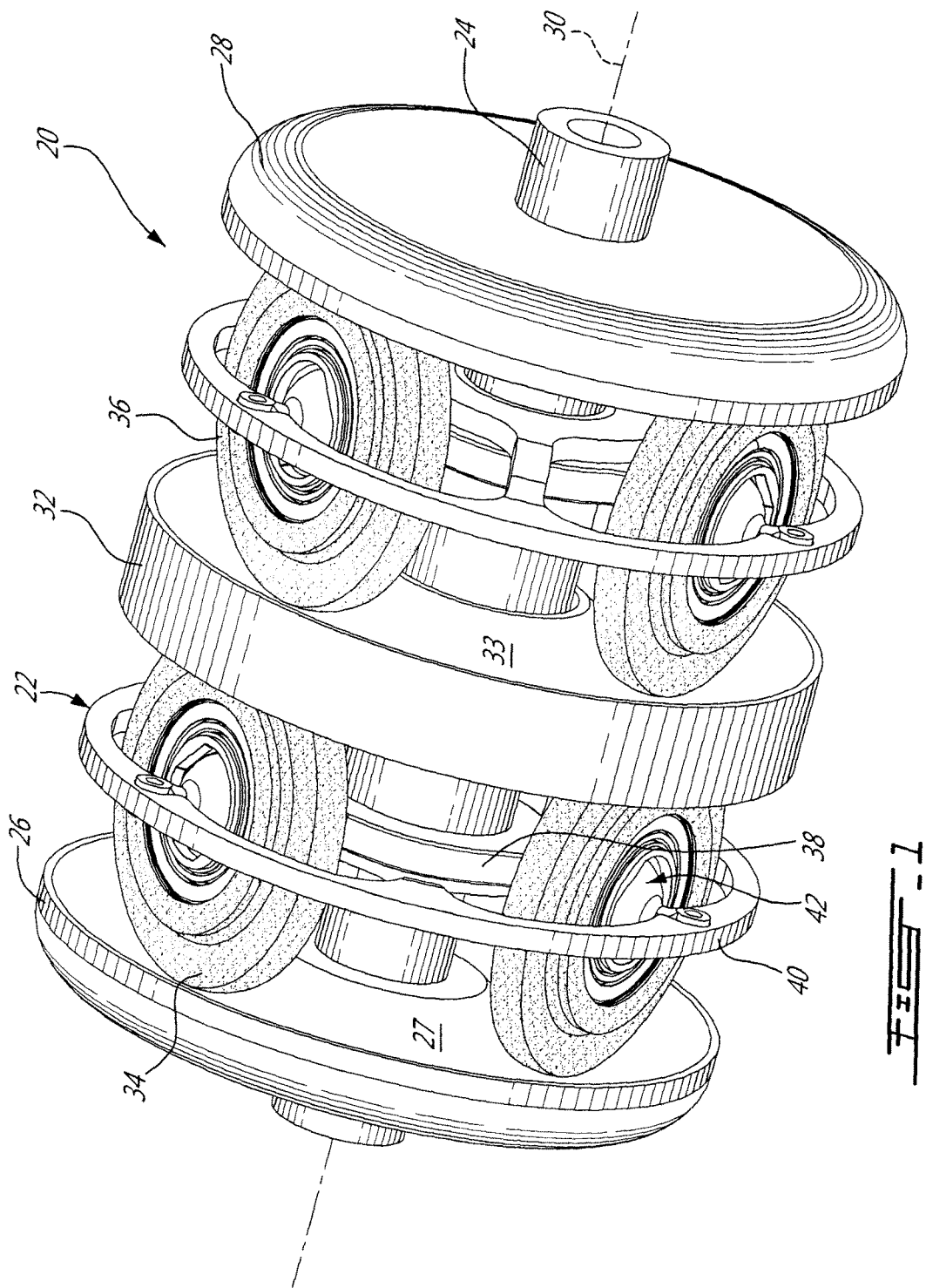

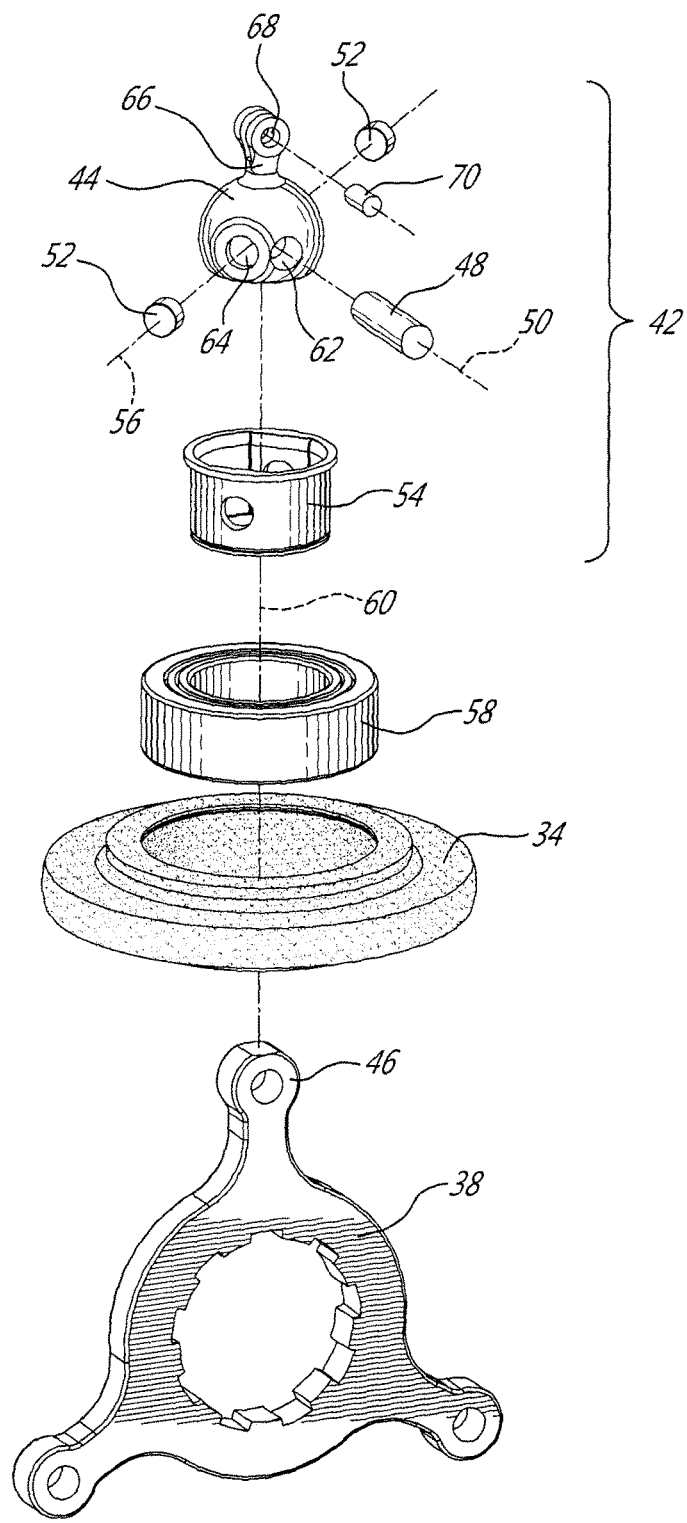

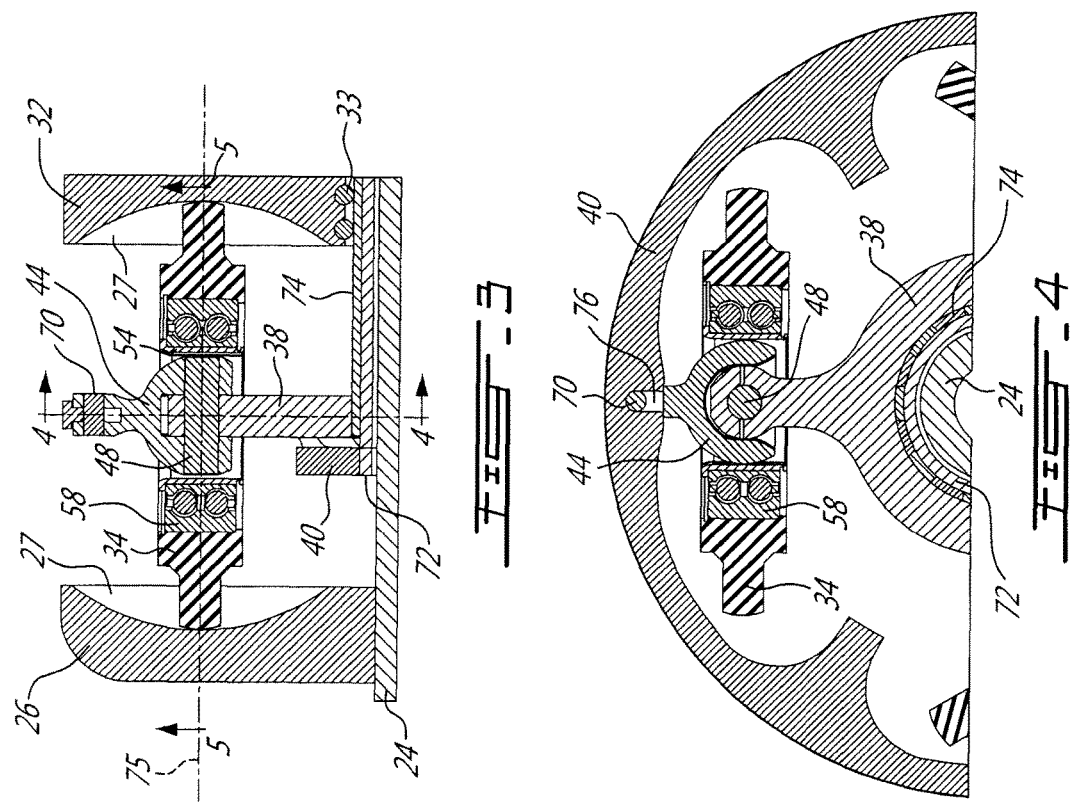
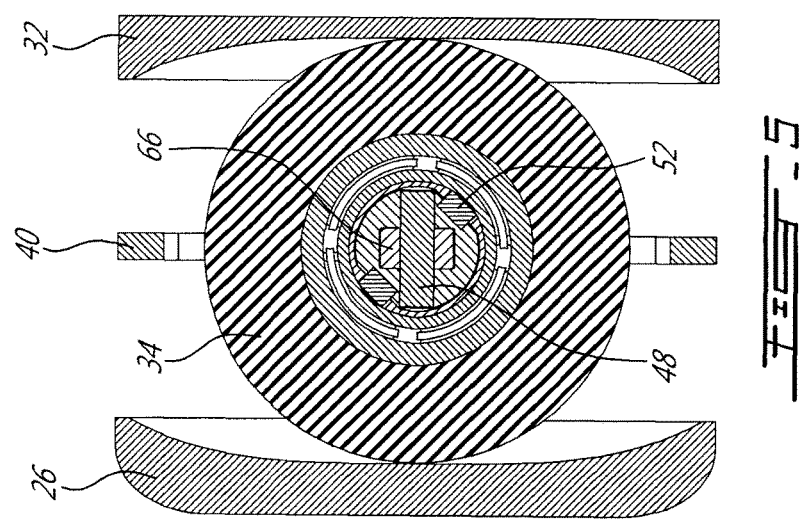

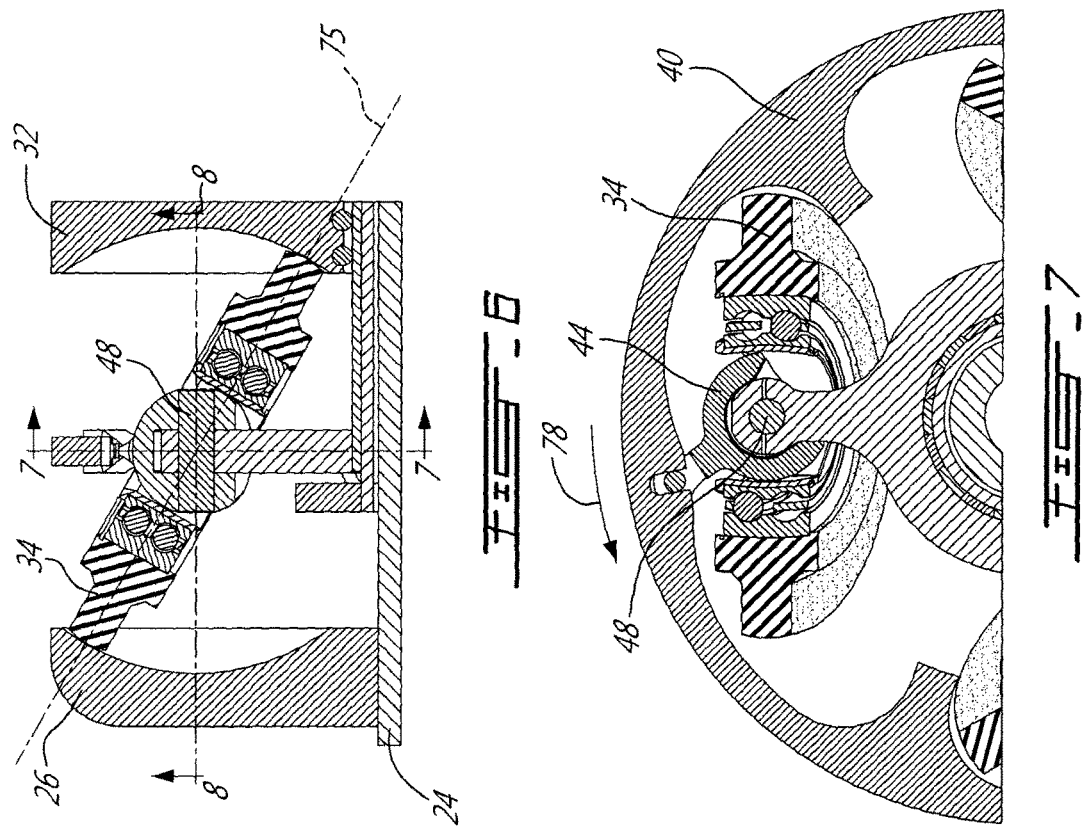
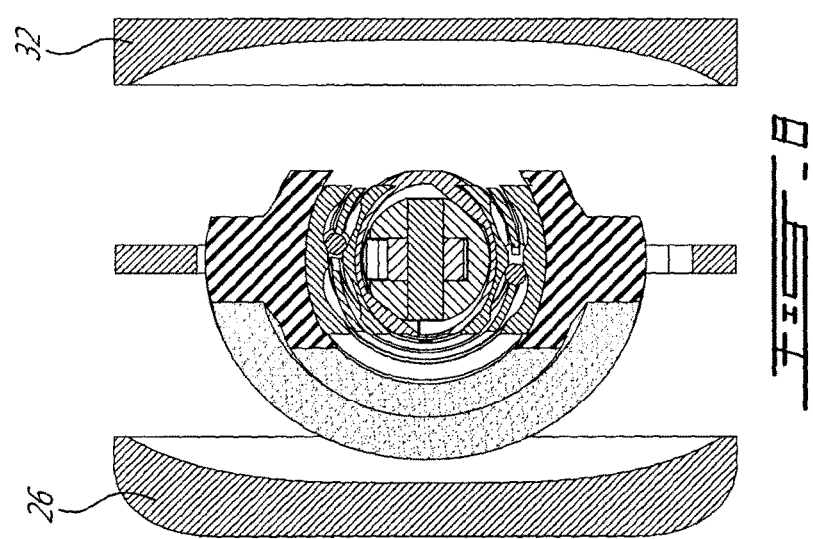

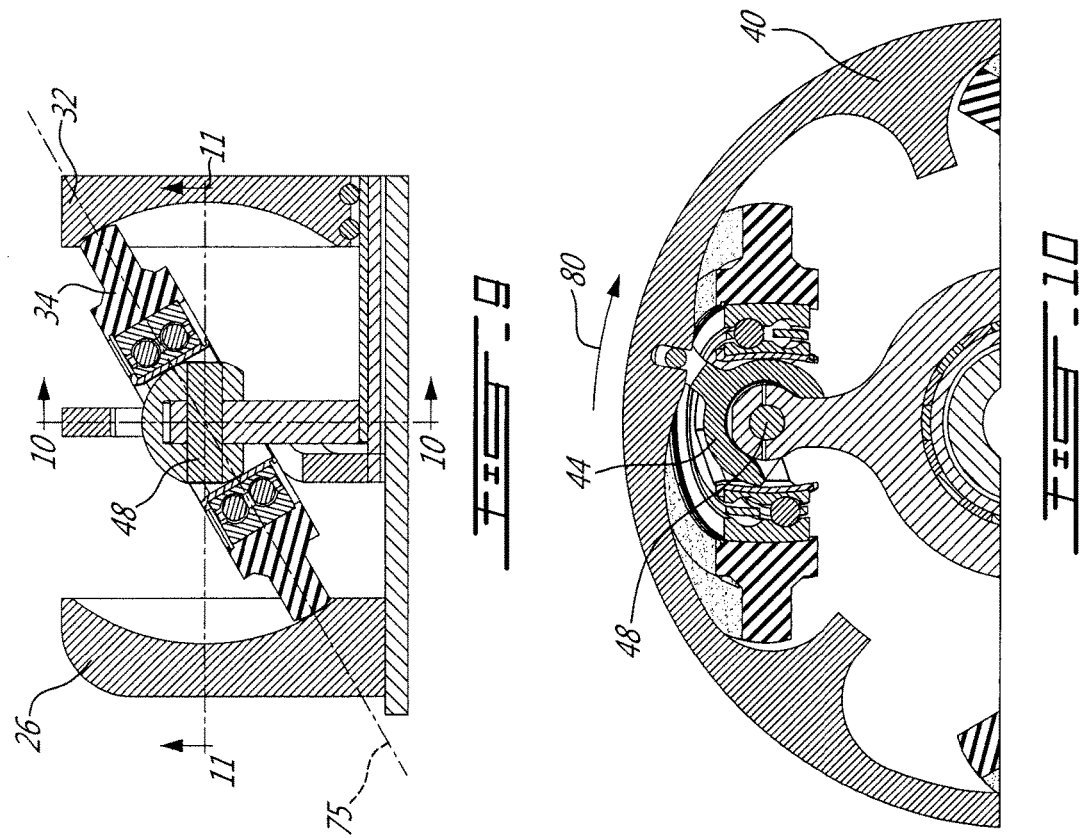
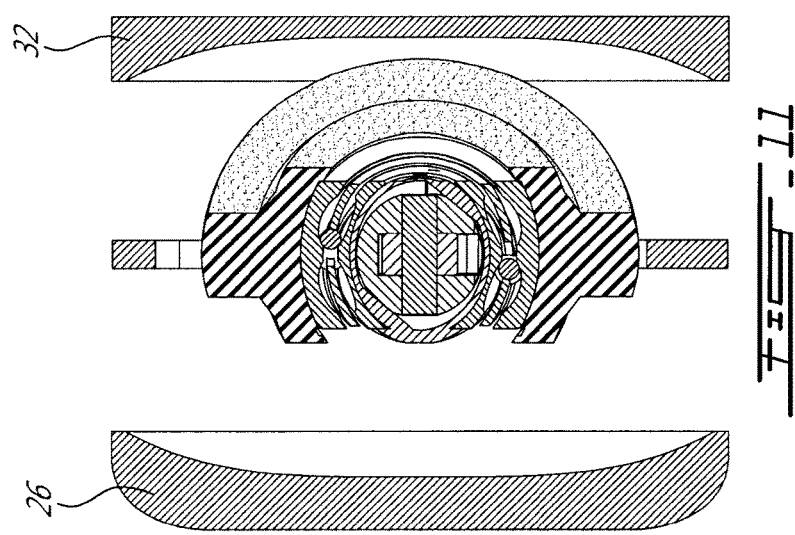

ROLLER POSITION CONTROL IN A TORIC-DRIVE CVT

FIELD

The present invention generally relates to Toric-drive Continuously Variable Transmissions. More specifically, the present invention is concerned with the control of the roller position in a Toric-drive CVT.

BACKGROUND

Toric-drive Continuously Variable Transmissions (hereinafter generically referred to as "CVT") are believed known in the art. The operation of such a CVT will therefore only be briefly discussed herein.

Generally stated, a CVT is provided with a drive disk having a toroidal surface, a driven disk also having a toroidal surface and facing the toroidal surface of the drive disk, both disks being linked by rollers in contact with their respective toroidal surfaces. The tilt angle of the rollers with respect to the drive and driven disks dictates the speed ratio between the driven and drive disks since this angle dictates the radial position at which the rollers contact the two toroidal surfaces.

These rollers are generally linked to one another so that their tilt angle is the same. A roller position control mechanism is therefore required to insure that the rollers present the same tilt angle and move simultaneously when they change from one ratio to another.

BRIEF DESCRIPTION OF THE DRAWINGS

In the appended drawings:

FIG. 1 is a schematic perspective view of a dual cavity full toroidal CVT provided with a roller position control mechanism according to an illustrative embodiment;

FIG. 2 is an exploded view of a roller provided with roller position control elements;

FIG. 3 is a sectional view of a roller shown in a unitary ratio; the section being taken in a radial plane in which lies the skew shaft and the longitudinal axis of the CVT;

FIG. 4 is a sectional view taken along line 4-4 of FIG. 3;

FIG. 5 is a sectional view taken along line 5-5 of FIG. 3;

FIG. 6 is a sectional view similar to FIG. 3 but showing the roller in a maximal overdrive position;

FIG. 7 is a sectional view taken along line 7-7 of FIG. 6;

FIG. 8 is a sectional view taken along line 8-8 of FIG. 6;

FIG. 9 is a sectional view similar to FIG. 3 but showing the roller in a maximal underdrive position;

FIG. 10 is a sectional view taken along line 10-10 of FIG. 9; and

FIG. 11 is a sectional view taken along line 11-11 of FIG. 9.

DETAILED DESCRIPTION

An object is generally to provide an improved roller position control in a toric-drive CVT.

According to an illustrative embodiment, there is provided a * A roller position control mechanism for a CVT provided with a longitudinal shaft, a first disk fixedly mounted to the longitudinal shaft, rotating about a longitudinal axis and having a toroidal surface; a second disk rotatably mounted to the longitudinal shaft, rotating about the longitudinal axis and having a toroidal surface facing the toroidal surface of the first disk; and at least one roller in contact with both toroidal surfaces and defining a roller plane perpendicular to a roller rotation axis, the roller position control mechanism comprising:

a spider element rotatably mounted to the longitudinal shaft, the spider element including, for each roller, a skew shaft generally parallel to the longitudinal shaft; the skew shaft defining a skew axis passing through the roller rotation axis;

a steering element so mounted to the skew shaft as to pivot about the skew axis; the steering element including a steering shaft defining a steering axis included in the roller plane; the steering axis defining an angle with the skew axis while being on the same plane; each roller being so pivotally mounted to the steering shaft as to pivot about the steering axis;

whereby, when the steering element is pivoted about the skew axis, the roller pivots about the steering axis so that the roller plane remains generally perpendicular to a radial plane in which lies the skew axis, therefore dictating a tilt angle of the roller with respect to the first and second disks.

According to another illustrative aspect, there is provided a A CVT comprising:

a longitudinal shaft;

first and second disks fixedly mounted to the longitudinal shaft, rotating about a longitudinal axis and having respective first and second toroidal surfaces;

a third disk rotatably mounted to the longitudinal shaft, rotating about a longitudinal axis and having first and second toroidal surfaces respectively facing the first and second toroidal surfaces of the first and second disks;

at least one first roller in contact with both first toroidal surfaces and defining a first roller plane perpendicular to the roller rotation axis;

at least one second roller in contact with both second toroidal surfaces and defining a second roller plane perpendicular to the roller rotation axis;

a roller position control mechanism comprising:

a first spider element rotatably mounted to the longitudinal shaft, the first spider element including, for each first roller, a first skew shaft generally parallel to the longitudinal shaft; the first skew shaft defining a first skew axis passing through the first roller rotation axis;

a first steering element so mounted to the first skew shaft as to pivot about the first skew axis; the first steering element including a first steering shaft defining a first steering axis included in the roller plane; the first steering axis defining an angle with the first skew axis while being on the same plane; each first roller being so pivotally mounted to the first steering shaft as to pivot about the first steering axis;

a first control ring interconnecting the first steering elements of each first roller so that they pivot about respective first skew shafts simultaneously;

a second spider element rotatably mounted to the longitudinal shaft, the second spider element including, for each second roller, a second skew shaft generally parallel to the longitudinal shaft; the second skew shaft defining a second skew axis passing through the second roller rotation axis;

a second steering element so mounted to the second skew shaft as to pivot about the skew axis; the second steering element including a second steering shaft defining a second steering axis included in the roller plane; the second steering axis defining an angle with the second skew axis while being on the same plane; each second roller being so pivotally mounted to the second steering shaft as to pivot about the second steering axis;

a second control ring interconnecting the second steering elements of each second roller so that they pivot about respective second skew shafts simultaneously; the first and second control rings being interconnected to as to move the first and second steering elements simultaneously;

whereby, when the first and second steering elements are pivoted about their respective first and second skew shafts by their respective control ring, the first and second rollers pivot about their respective first and second steering axis so that the each of the first and second roller planes of the first and second rollers remain generally perpendicular to a respective radial plane in which lies their respective first and second skew axis, therefore dictating a tilt angle or the first and second rollers with respect to the first, second and third disks.

According to a third aspect, there is provided a A CVT comprising:

a longitudinal shaft;

a first disks fixedly mounted to the longitudinal shaft, rotating about a longitudinal axis and having a toroidal surface;

a second disk rotatably mounted to the longitudinal shaft, rotating about a longitudinal axis and having a toroidal surface facing the toroidal surface of the first disk;

three rollers in contact with both toroidal surfaces and defining a roller plane perpendicular to the roller rotation axis;

a roller position control mechanism comprising:

a spider element rotatably mounted to the longitudinal shaft, the spider element including, for each roller, a skew shaft generally parallel to the longitudinal shaft; the skew shaft defining a skew axis passing through the roller rotation axis;

for each roller, a steering element so mounted to the skew shaft as to pivot about the skew axis; the steering element including a steering shaft defining a steering axis included in the roller plane; the steering axis defining an angle with the skew axis while being on the same plane; each roller being so pivotally mounted to the steering shaft as to pivot about the steering axis;

a control ring interconnecting the steering elements of each roller so that they pivot about respective skew shafts simultaneously;

whereby, when the steering elements are pivoted about their respective skew shafts by the control ring, the three rollers pivot about their respective steering axis so that each roller plane remain generally perpendicular to a respective radial plane passing through the respective skew axis, therefore dictating a tilt angle of the rollers with respect to the first and second disks.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that while the expression "CVT", standing for Continuously Variable Transmission is used herein to refer to a dual-cavity full toroidal CVT, however this expression is to be construed herein and in the appended claims as any type of toroidal CVT such as, for example, half-toroidal CVT and single cavity toroidal CVT.

It is to be noted that the expression "overdrive" when used herein in the context of a CVT, is to be construed herein and in the appended claims as a condition where the CVT ratio is such that the CVT output speed is higher than the CVT input speed.

It is to be noted that the expression "underdrive" when used herein in the context of a CVT, is to be construed herein and in the appended claims as a condition where the CVT ratio is such that the CVT output speed is lower than the CVT input speed.

Other objects, advantages and features of the roller position control mechanism will become more apparent upon reading of the following non-restrictive description of illustrative embodiments thereof, given by way of example only with reference to the accompanying drawings.

Generally stated, the roller position control mechanism as described in an illustrative embodiment includes a steering element, positioned inside the bearing of each roller and provided with a skew shaft and a steering shaft defining an angle therebetween. A spider element fixes the steering element to a longitudinal shaft of the CVT and a control ring element interconnects the steering elements of the various rollers. Movement of the control ring element translates to a tilting movement of the rollers, thanks to the angle between the skew and steering shafts.

Turning now to the appended figures, a CVT 20 provided with a roller position control mechanism 22 will be described.

The toric-drive CVT 20 includes a longitudinal main shaft 24 to which are fixedly mounted first and second drive disks 26 and 28 for rotation therewith about a longitudinal axis 30. A driven disk 32 is rotatably mounted to the main shaft 24, for example via bearings (see 33 in FIG. 3). Three rollers 34 are provided between the first drive disk 26 and the driven disk 32 while three rollers 36 are provided between the second drive disk 28 and the driven disk 32. The main shaft 24 is mounted to a casing (not shown) via bearings (also not shown).

The first drive disk 26 and the driven disk 32 include respective facing toroidal surfaces 27 (only one visible in FIG. 1) defining a first cavity while the second drive disk 28 and the driven disk 32 include respective facing toroidal surfaces 33 (only one visible in FIG. 1) defining a second cavity.

It will easily be understood by one skilled in the art that the dual cavity toric-drive CVT 20 is only schematically illustrated in FIG. 1. Indeed, many subsystems such as, for example, a casing and various sub-assemblies, are not shown for clarity and since they have no incidence on the structure and operation of the roller position control mechanism described herein.

The roller position control mechanism 22 includes, for each cavity, a spider element 38, a control ring 40 and three roller mounting mechanisms 42, better seen in exploded FIG. 2.

From FIG. 2, the roller mounting mechanism 42 includes a steering element 44 mounted to an end 46 of the spider element 38 via a skew shaft 48 so as to allow the steering element 44 to pivot about a skew axis 50, which is parallel to the longitudinal axis 30 of the CVT 20.

The steering element 44 includes a steering shaft in the form of two steering pins 52 so interconnecting the steering element 44 to a bearing holder 54 that the bearing holder 54 can pivot about the steering axis 56.

A bearing assembly 58 is used to rotatably mount the roller 34 to the bearing holder 54.

As can be seen from this Figure, the skew axis 50 and the steering axis 56 define an angle while being in the same plane. Furthermore, the skew axis 50 and the steering axis 56 pass through the rotation axis 60 of the roller 34 while the steering axis 56 is generally contained in the plane defined by the roller 34 when assembled.

The steering element 44 includes an aperture 62 to receive the skew shaft 48 and two apertures 64 (only one shown) to receive the steering pins 52. The steering element 44 also includes a projection 66 provided with an aperture 68 configured to receive a control shaft 70 linking the steering element 44 to the control ring 40. The control shaft 70 being parallel to the skew shaft 48. The control ring 40 is so mounted to the main shaft 24 that it can pivot about the longitudinal axis 30 when actuated by an appropriate actuator (not shown).

One skilled in the art will understand that all the elements of the roller mounting mechanism 42 of FIG. 2 are present for each of the three rollers 34 of the first cavity.

Similarly, all the elements of FIG. 2, including the spider 38, are also present in the second cavity. One skilled in the art will understand that since the first and second cavities share a disk 32, the various parts of the roller position control of the second cavity are mirror images of their counterpart of the first cavity with reference to the disk 32.

Since the steering element 44 of each roller of both cavities are interconnected by control rings 40, movements of the steering elements 44 are done simultaneously and of the same skew angle by a pivot action of the control rings 40 about the longitudinal axis.

Turning now to FIGS. 3 to 5 of the appended drawings, showing a roller 34 in a unitary ratio, i.e. that the rotational speed of the output disk 32 is the same as the rotational speed in the input disk 26.

FIG. 3 is a sectional view taken along a radial plane in which lies the skew axis 50 of the skew shaft 48 and the longitudinal axis 30 of the CVT. As can be seen from this figure, the control ring 40 is mounted to a control hub 72 linking the control rings 40 of both cavities. The control hub 72 is so rotatably mounted to the main shaft 24 and so as to be in a position to pivot when appropriately actuated by an actuator (not shown).

The spider element 38 is so mounted to a spider hub 74 rotatably mounted to the control hub 72 as to allow pivotment of the control hub 72. The spider hub 74 is also mounted to a casing (not shown) of the CVT 20 so that rotation of the spider hub 74 about the longitudinal axis 30 is prevented.

As can be seen from FIG. 3, which illustrates the CVT 20 in a steady state, i.e. when the control ring 40 has been immobilized for a predetermined time, the plane 75 defined by the roller 34 is generally perpendicular to a radial plane in which lies the skew axis of the skew shaft 48 and the longitudinal axis 30 of the CVT, i.e. the plane in which FIG. 3 is taken.

FIG. 4 illustrates that the control shaft 70 is linked to the control ring 40 via a radial slot 76, thereby allowing a pivot movement of the control ring 40 with respect to the rotationally fixed spider 38.

FIGS. 6 to 8 are views similar to FIGS. 3 to 5 but illustrate the roller 34 in a maximal overdrive ratio, when in a steady state.

As can be seen from FIG. 7, the change from the unity ratio of FIGS. 3 to 6 to the maximal overdrive ratio has been initiated by a pivot action of the control ring 40 (see arrow 78). This pivot action moves the control element 44 about the shaft 48, to thereby change the angle between the steering shaft and the main shaft 24. Accordingly, this pivot action initially results in the plane 75 of the roller no longer being generally perpendicular to the radial plane on which lie the longitudinal axis of the CVT 30 and the roller skew axis 50. Accordingly each roller is no longer rolling along a steady state circular track along the disks 26 and 32 but on a transitory spiral track forcing the roller 34 contact between the input disk 26 to move on a higher track while bringing the contact of the roller 34 and the output disk 32 to a lower track. The various forces generated by the counter-rotating disks 26 and 32 are such that this tilting movement of the roller 34 pivots the bearing holder 54 about the steering axis 56 to thereby bring the roller 34 in a position where its plane is generally perpendicular to a radial plane where lie the skew axis of the skew shaft 48. This situation is shown in FIGS. 6 to 8 representing the roller 34 when it reaches steady state thus rolling back on a circular track along the disks 26 and 32 but now at the maximum overdrive ratio of the CVT.

FIGS. 9 to 11 are views similar to FIGS. 3 to 5 but illustrate the roller 34 in a maximal underdrive ratio, when in a steady state.

As can be seen from FIG. 10, the change from the unity ratio of FIGS. 3 to 6 to the maximal underdrive ratio has been initiated by a pivot action of the control ring 40 (see arrow 80). This pivot action moves the control element 44 about the shaft 48, to thereby change the angle between the steering shaft and the main shaft 24. Accordingly, this pivot action initially results in the roller plane no longer being generally perpendicular to the radial plane on which lie the longitudinal axis of the CVT 30 and the roller skew axis 50. Accordingly each roller is no longer rolling along a steady state circular track along the disks 26 and 32 but on a transitory spiral track forcing the roller 34 contact between the input disk 26 to move on a lower track while bringing the contact of the roller 34 and the output disk 32 to a higher track. The various forces generated by the counter-rotating disks 26 and 32 are such that this tilting movement of the roller 34 pivots the bearing holder 54 about the steering axis 56 to thereby bring the roller 34 in a position where its plane is generally perpendicular to a radial plane where lie the skew axis of the skew shaft 48 and the longitudinal axis 30. This situation is shown in FIGS. 9 to 11 representing the roller 34 when it reaches steady state thus rolling back on a circular track along the disks 26 and 32 but now at the maximum underdrive ratio of the CVT.

It will be apparent to one skilled in the art that the transmission ratio of the CVT 20 can be anywhere between the overdrive ratio of FIGS. 6 to 8 and the underdrive ratio of FIGS. 9 to 11.

One skilled in the art will understand that the angle present between the skew axis and the steering axis, the geometry of the rollers and of the toroidal surfaces of the input and output disks, along with the various forces imposed on the rollers by the counter rotating input and output disks, are such that, when the CVT is in a steady state, the plane of each roller is generally perpendicular to a radial plane in which lie the longitudinal axis of the CVT shaft and the skew axis of the skew shaft of that particular roller, which brings stability to the roller and to the CVT as a whole.

It will be understood by one skilled in the art that the angle defined by the skew axis 50 and the steering axis 56 is highly dependent on the geometry and size of the various elements of the CVT and on the maximal desired tilt angle of the rollers. In the illustrative example shown in the drawings and described herein, it has been found that an angle of about 45 degrees between the axes is interesting. It will be understood that by decreasing this angle, the pivoting movement of the control ring 40 required to move the rollers to the maximal tilt angle needs to be greater which may cause clearance problems. On the other hand, if the angle defined by the skew axis 50 and the steering axis 56 is greater, the range of pivoting of the control ring 40 to move between the maximal tilt angles of the rollers is decreased which may magnify the effects of any deviation from manufacturing tolerances.

One skilled in the art will understand that while the steering element 44 is shown as a generally spherical element, that this shape could be changed should more space be available in the bearing holder 54. In other words, the generally spherical shape of the steering element 44 is for space saving purpose and not for functionality.

In the illustrative embodiment described hereinabove and shown in the appended drawings, the pivot movement of the control ring 40 is the cause of the change of the rollers tilt angle. One skilled in the art will understand that the cause is really the modification of the pivotal position of the control ring with respect to the spider element 38 that is rotationally fixed. Accordingly, it would be possible to design a roller position control mechanism where the control ring would be fixed and where the spider element could pivot.

One skilled in the art will understand that while a double-cavity toroidal CVT has been illustrated herein, other toroidal CVT technologies could be used. As non-limiting examples, single cavity toroidal CVTs and half-toroidal CVTs could be used.

It is to be understood that the roller position control is not limited in its application to the details of construction and parts illustrated in the accompanying drawings and described hereinabove. The roller position control is capable of other embodiments and of being practiced in various ways. It is also to be understood that the phraseology or terminology used herein is for the purpose of description and not limitation. Hence, although the roller position control has been described hereinabove by way of illustrative embodiments thereof, it can be modified, without departing from the spirit, scope and nature of the subject invention.

What is claimed is:

1. A roller position control mechanism for a CVT provided with a longitudinal shaft, a first disk fixedly mounted to the longitudinal shaft, rotating about a longitudinal axis and having a toroidal surface; a second disk rotatably mounted to the longitudinal shaft, rotating about the longitudinal axis and having a toroidal surface facing the toroidal surface of the first disk; and at least one roller in contact with both toroidal surfaces and defining a roller plane perpendicular to a roller rotation axis, the roller position control mechanism comprising:
   a spider element rotatably mounted to the longitudinal shaft, the spider element including, for each at least one roller, a skew shaft generally parallel to the longitudinal shaft; the skew shaft defining a skew axis passing through the roller rotation axis;
   a steering element so mounted to the skew shaft as to pivot about the skew axis; the steering element including a steering shaft defining a steering axis included in the roller plane; the steering axis defining an angle with the skew axis while being on the same plane; each at least one roller being so pivotally mounted to the steering shaft as to pivot about the steering axis; the steering element further includes a control shaft defining a control axis generally parallel to the longitudinal axis and spaced apart from the skew shaft,
   a control ring interconnecting the steering elements of each at least one roller provided between the first and second disks; the steering elements being interconnected to the control ring via the control shaft so that a rotation of the control ring about the longitudinal axis causes the steering element to pivot about the skew axis;
   whereby, when the steering element is pivoted about the skew axis, the roller pivots about the steering axis so that the roller plane remains generally perpendicular to a radial plane in which lies the skew axis, therefore dictating a tilt angle of the roller with respect to the first and second disks.

2. A roller position control mechanism as recited in claim 1, wherein the roller is mounted to the steering shaft via a bearing holder, pivotally mounted to the steering shaft, and a bearing provided between the bearing holder and the roller to allow the roller to rotate about the roller rotation axis.

3. A roller position control mechanism as recited in claim 1, wherein the steering element is generally spherical and includes a projection to receive the control shaft.

4. A roller position control mechanism as recited in claim 1, wherein the angle between the skew axis and the steering axis is about 45 degrees.

5. A roller position control mechanism as recited in claim 1, wherein the first disk is an input disk and wherein the second disk is an output disk.

6. A CVT comprising:
   a longitudinal shaft;
   first and second disks fixedly mounted to the longitudinal shaft, rotating about a longitudinal axis and having respective first and second toroidal surfaces;
   a third disk rotatably mounted to the longitudinal shaft, rotating about a longitudinal axis and having first and second toroidal surfaces respectively facing the first and second toroidal surfaces of the first and second disks;
   at least one first roller in contact with both first toroidal surfaces and defining a first roller plane perpendicular to the roller rotation axis;
   at least one second roller in contact with both second toroidal surfaces and defining a second roller plane perpendicular to the roller rotation axis;
   a roller position control mechanism comprising:
   a first spider element rotatably mounted to the longitudinal shaft, the first spider element including, for each first roller, a first skew shaft generally parallel to the longitudinal shaft; the first skew shaft defining a first skew axis passing through the first roller rotation axis;
   a first steering element so mounted to the first skew shaft as to pivot about the first skew axis; the first steering element including a first steering shaft defining a first steering axis included in the roller plane; the first steering axis defining an angle with the first skew axis while being on the same plane; each first roller being so pivotally mounted to the first steering shaft as to pivot about the first steering axis;
   a first control ring interconnecting the first steering elements of each first roller via first control shafts so that they pivot about respective first skew shafts simultaneously; the first control shafts being generally parallel to the longitudinal shaft and respectively radially spaced apart from the first skew shafts;

a second spider element rotatably mounted to the longitudinal shaft, the second spider element including, for each second roller, a second skew shaft generally parallel to the longitudinal shaft; the second skew shaft defining a second skew axis passing through the second roller rotation axis;

a second steering element so mounted to the second skew shaft as to pivot about the skew axis; the second steering element including a second steering shaft defining a second steering axis included in the roller plane; the second steering axis defining an angle with the second skew axis while being on the same plane; each second roller being so pivotally mounted to the second steering shaft as to pivot about the second steering axis;

a second control ring interconnecting the second steering elements of each second roller via second control shafts so that they pivot about respective second skew shafts simultaneously; the second control shafts being generally parallel to the longitudinal shaft and respectively radially spaced apart from the second skew shafts; the first and second control rings being interconnected to as to move the first and second steering elements simultaneously;

whereby, when the first and second steering elements are pivoted about their respective first and second skew shafts by their respective control ring, the first and second rollers pivot about their respective first and second steering axis so that the each of the first and second roller planes of the first and second rollers remain generally perpendicular to a respective radial plane in which lies their respective first and second skew axis, therefore dictating a tilt angle or the first and second rollers with respect to the first, second and third disks.

7. A CVT as recited in claim 6, wherein a) each of the first rollers are mounted to the first steering shaft via a first bearing holder, pivotally mounted to the first steering shaft, and a first bearing provided between the first bearing holder and the first roller to allow the first roller to rotate about the first roller rotation axis; and b) each of the second rollers are mounted to the second steering shaft via a second bearing holder, pivotally mounted to the second steering shaft, and a second bearing provided between the second bearing holder and the second roller to allow the second roller to rotate about the second roller rotation axis.

8. A CVT as recited in claim 6, wherein a) the first steering element includes a first control shaft defining a first control axis generally parallel to the longitudinal axis and spaced apart from the first skew shaft, the first control shaft interconnecting the first steering element to the first control ring so that a rotation of the first control ring about the longitudinal axis causes the first steering element to pivot about the first skew axis and the first roller to pivot about the first steering axis, and b) the second steering element includes a second control shaft defining a second control axis generally parallel to the longitudinal axis and spaced apart from the second skew shaft, the second control shaft interconnecting the second steering element to the second control ring so that a rotation of the second control ring about the longitudinal axis causes the second steering element to pivot about the second skew axis and the second roller to pivot about the second steering axis.

9. A CVT as recited in claim 6, wherein the first and second steering elements are generally spherical and include respective first and second projections to respectively receive first and second control shafts to respectively interconnect the first and second steering elements to the first and second control rings.

10. A CVT as recited in claim 6, wherein the angle between the first skew axis and the first steering axis is about 45 degrees, and wherein the angle between the second skew axis and the second steering axis is about 45 degrees.

11. A CVT as recited in claim 6, wherein the first and second disks are input disks and wherein the third disk is an output disk.

12. A CVT comprising:
a longitudinal shaft;
a first disks fixedly mounted to the longitudinal shaft, rotating about a longitudinal axis and having a toroidal surface;
a second disk rotatably mounted to the longitudinal shaft, rotating about a longitudinal axis and having a toroidal surface facing the toroidal surface of the first disk;
three rollers in contact with both toroidal surfaces and defining a roller plane perpendicular to the roller rotation axis;
a roller position control mechanism comprising:
a spider element rotatably mounted to the longitudinal shaft, the spider element including, for each roller, a skew shaft generally parallel to the longitudinal shaft; the skew shaft defining a skew axis passing through the roller rotation axis;
for each roller, a steering element so mounted to the skew shaft as to pivot about the skew axis; the steering element including a steering shaft defining a steering axis included in the roller plane; the steering axis defining an angle of about 45 degrees with the skew axis while being on the same plane; each roller being so pivotally mounted to the steering shaft as to pivot about the steering axis;
a control ring interconnecting the steering elements of each roller so that they pivot about respective skew shafts simultaneously;
whereby, when the steering elements are pivoted about their respective skew shafts by the control ring, the three rollers pivot about their respective steering axis so that each roller plane remain generally perpendicular to a respective radial plane passing through the respective skew axis, therefore dictating a tilt angle of the rollers with respect to the first and second disks.

13. A CVT as recited in claim 12, wherein the control ring is connected to the steering element via a control shaft generally parallel to the longitudinal shaft and radially spaced apart from the skew shaft.

14. A CVT as recited in claim 13, wherein the steering element includes a control shaft defining a control axis generally parallel to the longitudinal axis and spaced apart from the skew shaft, the control shaft interconnecting the steering element to the control ring so that a rotation of the control ring about the longitudinal axis causes the steering element to pivot about the skew axis and the roller to pivot about the steering axis.

15. A CVT as recited in claim 14 wherein the steering element is generally spherical and include a projection to receive the control shaft.

16. A CVT as recited in claim 12, wherein each roller is mounted to the steering shaft via a bearing holder, pivotally mounted to the steering shaft, and a bearing provided between the bearing holder and the roller to allow the roller to rotate about the roller rotation axis.

17. A CVT as recited in claim 12, wherein the first disk is an input disk and wherein the second disk is an output disk.

\* \* \* \* \*